United States Patent
Fagan et al.

(10) Patent No.: US 7,140,805 B1
(45) Date of Patent: Nov. 28, 2006

(54) METHOD OF TREATING MUNICIPAL SOLID WASTE

(76) Inventors: Dennis A. Fagan, 113 E. Chemung Pl., Elmira, NY (US) 14904; Paul E. Sullivan, 3637 Batzing Rd., Caledonia, NY (US) 14423

( * ) Notice: Subject to any disclaimer, the term of this patent is extended or adjusted under 35 U.S.C. 154(b) by 0 days.

(21) Appl. No.: 10/724,682

(22) Filed: Dec. 1, 2003

Related U.S. Application Data

(63) Continuation of application No. 09/692,925, filed on Oct. 20, 2000, now abandoned.

(60) Provisional application No. 60/160,775, filed on Oct. 21, 1999.

(51) Int. Cl.
B09B 3/00 (2006.01)

(52) U.S. Cl. .............. 405/129.2; 405/129.95

(58) Field of Classification Search ......... 405/128.25, 405/128.45, 128.5, 128.7, 128.75, 129.2, 405/129.25, 129.95, 271, 129.9, 269; 210/96.1, 210/170, 747, 752; 172/508, 540, 813, 817; 37/403, 405, 395, 397; 588/250–253
See application file for complete search history.

(56) References Cited

U.S. PATENT DOCUMENTS

| | | | |
|---|---|---|---|
| 3,614,867 A * | 10/1971 | Nieman | 405/129.15 |
| 3,776,528 A * | 12/1973 | Toto | 425/62 |
| 4,519,338 A * | 5/1985 | Kramer et al. | 118/305 |
| 4,913,586 A * | 4/1990 | Gabbita | 405/128.75 |
| 5,040,920 A | 8/1991 | Forrester | |
| 5,054,406 A * | 10/1991 | Judd | 110/346 |
| 5,161,915 A | 11/1992 | Hansen | |
| 5,265,979 A | 11/1993 | Hansen | |
| 5,324,138 A * | 6/1994 | Hansen | 405/129.2 |
| 5,362,181 A | 11/1994 | DenBesten | |
| 5,415,496 A | 5/1995 | DenBesten | |
| 5,536,116 A * | 7/1996 | Lammers et al. | 405/129.9 |
| 5,562,365 A * | 10/1996 | Berrange | 405/271 |
| 5,564,862 A | 10/1996 | Markels, Jr. | |
| 5,620,281 A * | 4/1997 | Lammers et al. | 405/129.9 |
| 5,830,752 A * | 11/1998 | Bruso | 435/283.1 |
| 5,967,242 A * | 10/1999 | Caron et al. | 172/817 |
| 5,984,580 A | 11/1999 | Ham et al. | |
| 6,024,513 A | 2/2000 | Hudgins et al. | |
| 6,033,154 A * | 3/2000 | Curtis et al. | 405/263 |

(Continued)

FOREIGN PATENT DOCUMENTS

DE 3722270 * 2/1988

(Continued)

*Primary Examiner*—Frederick L. Lagman
(74) *Attorney, Agent, or Firm*—Nixon Peabody LLP

(57) ABSTRACT

One aspect of the present invention relates to a method of treating municipal solid waste which includes landfilling a volume of solid waste, a substantial portion of which has been exposed to the atmosphere, adding moisture to the solid waste, compacting the moistened solid waste, and applying a daily covering material to the compacted solid waste. Alternatively, the method can be performed by adding moisture to the waste prior to landfilling. A further aspect of the present invention relates to a method of adding moisture to municipal solid waste which includes providing a fluid delivery system, exposing a substantial portion of a volume of solid waste to the atmosphere, and adding moisture to the volume of solid waste using the fluid delivery system, where such fluid delivery system includes an excavator having a movable arm and a fluid jet coupled to the movable arm, and means for delivering fluid, where such means for delivering fluid is coupled to the fluid jet of the excavator for delivery of fluid from a fluid source to the fluid jet.

7 Claims, 2 Drawing Sheets

U.S. PATENT DOCUMENTS

| | | | |
|---|---|---|---|
| 6,152,656 A * | 11/2000 | Curtis et al. | 406/34 |
| 6,171,020 B1 * | 1/2001 | Pikna et al. | 404/121 |
| 6,171,024 B1 * | 1/2001 | Curtis et al. | 405/128.45 |
| 6,202,330 B1 * | 3/2001 | Bolton | 37/403 |
| 6,293,731 B1 * | 9/2001 | Studer | 405/129.2 |
| 6,558,079 B1 * | 5/2003 | Kozak et al. | 405/129.15 |

FOREIGN PATENT DOCUMENTS

| | | | |
|---|---|---|---|
| DE | 3908608 | * | 9/1990 |
| GB | 2313793 | * | 10/1997 |

* cited by examiner

METHOD OF TREATING MUNICIPAL SOLID WASTE

This application is a continuation of U.S. patent application Ser. No. 09/692,925 filed Oct. 20, 2000, now abandoned, which claims priority benefit of U.S. Provisional Patent Application Ser. No. 60/160,775 filed Oct. 21, 1999, each of which is hereby incorporated by reference in its entirety.

FIELD OF THE INVENTION

The present invention relates generally to the field of environmental engineering and solid waste disposal, more specifically, methods of treating municipal solid waste while landfilling the same.

BACKGROUND OF THE INVENTION

It is well-known today that both commercial and domestic activities produce an enormous amount of solid waste. Almost all of this waste is deposited into municipal landfills causing existing landfills to quickly fill to their capacity. Therefore, landfill space is significantly limited making it a valuable commodity. It is, therefore, necessary to efficiently utilize presently existing landfill space to its maximum landfill capacity. Developing new landfill sites or expanding existing ones could help alleviate the problem of dwindling landfill space. However, obtaining the necessary approvals for construction of new landfills on virgin land is extremely difficult. Therefore, this problem is preferably solved by maximizing the amount of solid waste existing landfill sites can handle.

Conventional landfilling techniques generally include spreading each load of newly introduced municipal solid waste into about one to five-foot high layers and then compacting the spread solid waste. These steps of spreading and compacting are repeated for each additional load of newly introduced waste, with the newly introduced waste being placed and compacted either adjacent to or on top of previously spread and compacted waste. At the end of the day, a daily covering material is typically placed onto the newly introduced waste. The process is repeated each day until the landfill site is filled, at which time the site is capped and venting is provided to prevent build-up of decomposition gases.

One problem with conventional landfill techniques is that the waste density is not maximized; hence, not as much waste is capable of being introduced into the landfill site before it is closed. This certainly affects the profitability of the landfill, but it is also a poses a significant problem to individual communities given the difficulties encountered in opening new landfill sites. Thus, it would be desirable to maximize the use of existing landfill sites by enhancing the in-place density of waste introduced into landfill sites.

A second problem with most conventional landfill sites is the need to remove and/or treat leachate, which is the liquid seepage recovered from landfill sites. It is typically sent to an off-site wastewater treatment facility or treated on-site prior to release of treated effluent into the environment.

In order to try to minimize the production of landfill leachate, many federal and state regulations attempt to keep the waste dry through the installation of impermeable landfill caps once the final grades have been achieved. Current regulations require landfill operators to fund a post-closure reserve account to maintain the landfill for a period of at least 30 years after the landfill is closed. An inherent criticism of landfill closure projects is that the partially decomposed waste is entombed by a relative water tight cap such that this waste has the potential to slowly degrade and contaminate groundwater resources for decades or even centuries after the 30-year post-closure period is ended. Hence post-closure liability concerns are very real for conventional landfill designs.

While others have proposed systems and methods for enhancing compaction and reduction in leachate treatment or leachate disposal costs, the systems and methods employed typically involve either labor or equipment-intensive steps, such as shredding of the waste prior to landfilling or injecting air into the waste, in order to overcome some of the above-described problems. With the addition of labor or equipment-intensive steps, the expense of landfilling municipal solid waste will become increasingly more expensive. With the increased expense, the landfill operator may realize little, if any, of the cost savings achieved by any increase in compaction densities.

Thus, it would be desirable to achieve significant increases in waste compaction densities and eliminate or minimize leachate treatment or disposal costs, while enhancing the decomposition process of organic wastes, but without significantly increasing the expense of landfilling waste as compared to conventional landfill operations.

The present invention relates to an improved method of treating municipal solid waste which overcomes these and other deficiencies in the art.

SUMMARY OF THE INVENTION

One aspect of the present invention relates to a method of treating municipal solid waste including: landfilling a volume of solid waste, a substantial portion of which has been exposed to the atmosphere; adding moisture to the solid waste; compacting the moistened solid waste; and applying a daily covering material to the compacted solid waste.

Another aspect of the present invention relates to an alternative method of treating municipal solid waste including: adding moisture to a volume of solid waste, a substantial portion of which has been exposed to the atmosphere; landfilling the moistened solid waste to a predetermined height; compacting the moistened solid waste; and applying a daily covering material to the compacted solid waste.

A further aspect of the present invention relates to a method of adding moisture to municipal solid waste including: providing a fluid delivery system; exposing a substantial portion of a volume of solid waste to the atmosphere; and adding moisture to the volume of solid waste using the fluid delivery system. The fluid delivery system includes an excavator including a movable arm and a fluid jet coupled to the movable arm, and means for delivering fluid, where the means for delivering fluid is coupled to the fluid jet of the excavator for delivery of fluid from a fluid source to the fluid jet.

Yet another aspect of the present invention relates to a fluid delivery system which includes an excavator including a movable arm and a fluid jet coupled to the movable arm, and means for delivering fluid, where the means for delivering fluid is coupled to the fluid jet of the excavator for delivery of fluid from a fluid source to the fluid jet.

By adding moisture to a volume of solid waste which preferably has been handled such that a substantial portion of which has been exposed to the atmosphere, albeit without shredding or comminuting the waste, it is believed to be possible to achieve significantly improved compaction densities without significantly adding to the expense of operating the landfill site. Moreover, significant expenses in the handling of waste or removal of landfill leachate are minimized by treating the solid waste according to the present invention. Thus, the present invention affords compaction densities which far exceed conventional landfill site densities and yet avoids unwanted time and labor expenses inherent in the performance of other known methods of treating solid waste.

DESCRIPTION OF THE INVENTION

Figure 1A:
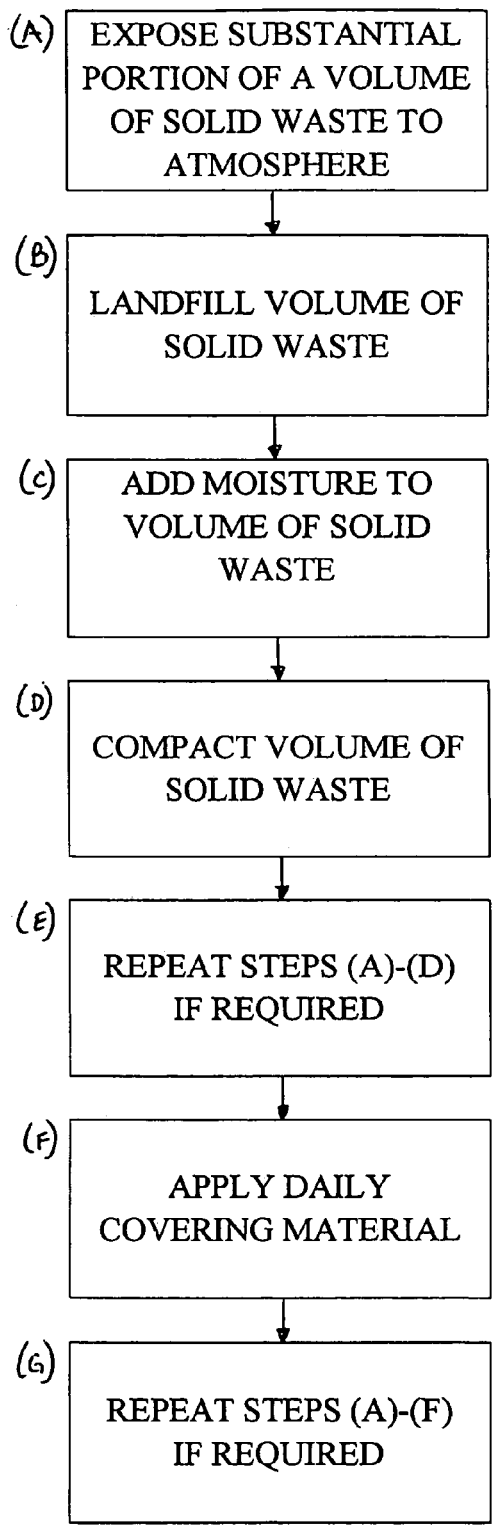
FIGS. 1A–B are flow charts which illustrate two embodiments of treating solid waste in accordance with the present invention.
Figure 1B:
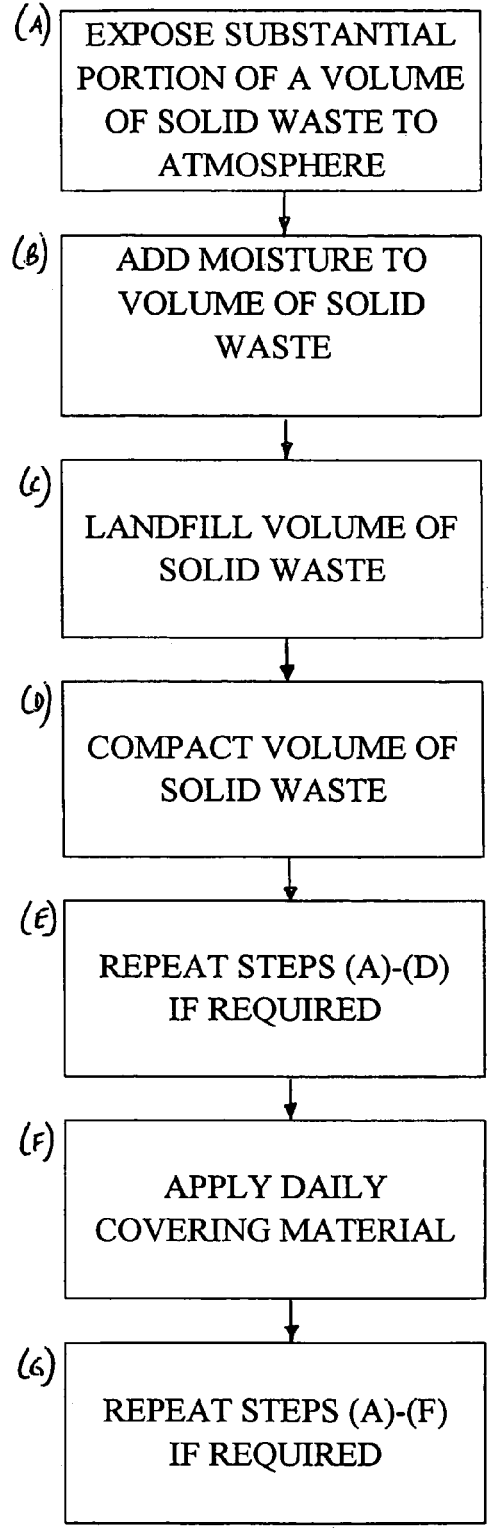

One aspect of the present invention relates to a method of treating municipal solid waste. This method includes landfilling a volume of solid waste, substantially all of which has been exposed to the atmosphere, adding moisture to the solid waste, compacting the moistened solid waste, and applying a daily covering material to the compacted solid waste.

Alternatively, the method of the present invention can be performed by adding moisture to a volume of solid waste, a substantial portion of which has been exposed to the atmosphere, landfilling the moistened solid waste, compacting the moistened solid waste, and applying a daily covering material to the compacted solid waste.

Moreover, it should be appreciated by one of skill in the art that adding moisture to the volume of solid waste can also be performed both while a substantial portion thereof is being exposed to the atmosphere and while it is being landfilled.

Many communities provide recycling programs which minimize the volume of recyclable materials that are introduced into a landfill site for disposal. Despite this effort to minimize disposal of recyclable materials, recyclable materials often find their way into landfill sites. To the extent that it is both physically and economically feasible, it is desirable to remove as many recyclable materials as possible before landfilling solid waste materials. Under certain circumstances, this option may not be feasible.

Since solid waste generally contains a significant volume of material encapsulated within plastic bags and the like, it is desirable to first expose a substantial portion of a volume of solid waste to the atmosphere prior to landfilling or prior to or simultaneous with adding moisture. By breaking open as many of the plastic bags as possible, subsequent biostabilization of the solid waste is facilitated. To accomplish the breaking of plastic bags and the like, a landfill operator can use a conventional compactor, a conventional landfill dozer, or a conventional excavator equipped with a grapple hook. Most landfill sites will be equipped with one or more of these pieces of equipment; therefore, its use as disclosed herein will not substantially increase the cost of performing the methods of treating solid waste as disclosed herein.

As used herein with respect to the volume of solid waste introduced into a landfill facility, the "substantial portion" which is exposed to the atmosphere refers to at least about 50 percent of the volume of solid waste. Preferably, "substantial portion" refers to about 70 percent or more of the volume of solid waste, more preferably 80 percent or greater, and even more preferably 90 percent or greater. In a preferred embodiment of the present invention, substantially all (i.e., 95 percent or more) of the volume of solid waste is exposed to the atmosphere.

While exposing a substantial portion of the waste to the atmosphere should be carried out as described above or using equivalent means known to those of skill in the art, it is specifically intended to exclude the process of shredding, comminuting, or otherwise substantially reducing the size of waste particles in the volume of solid waste which is being treated. It is believed that shredding, comminuting, or otherwise substantially reducing the size of waste particles involves significant expense while providing no substantially improved results in the efficiency (i.e., biostabilization and compaction densities) of the landfill site. While some waste particles may inevitably be reduced in size during the process of exposing a substantial portion of the waste to the atmosphere, such size reduction is incidental and minimal in comparison to that which would occur during deliberate shredding, comminuting, or otherwise reducing the size of waste particles in the volume of solid waste which is treated.

After exposing a substantial portion of a volume of solid waste to the atmosphere, the solid waste is then either landfilled using conventional procedures at a particular landfill site or moistened by introducing a liquid onto the solid waste. Alternatively, the moisture can be added to the solid waste simultaneously with the step of exposing the substantial portion of the solid waste to the atmosphere, the step of landfilling the solid waste, or both.

Typically, the solid waste hauled into the landfill site on a given day is introduced to the landfill at the working face of a lift (e.g., a pile of solid waste material), whose size is increased incrementally in height and length over the course of time. In any given day, for example, as waste is landfilled it is compacted into approximately two foot thick layers which are built up over the course of the day to form a lift which is approximately six to ten feet high. The dimensions of the lift will necessarily vary according to the volume of solid waste which is landfilled on any given day. Also, the particular physical dimensions of a landfill site or governmental regulations in place at the site may control exactly how the volume of solid waste is landfilled.

Figure 2:
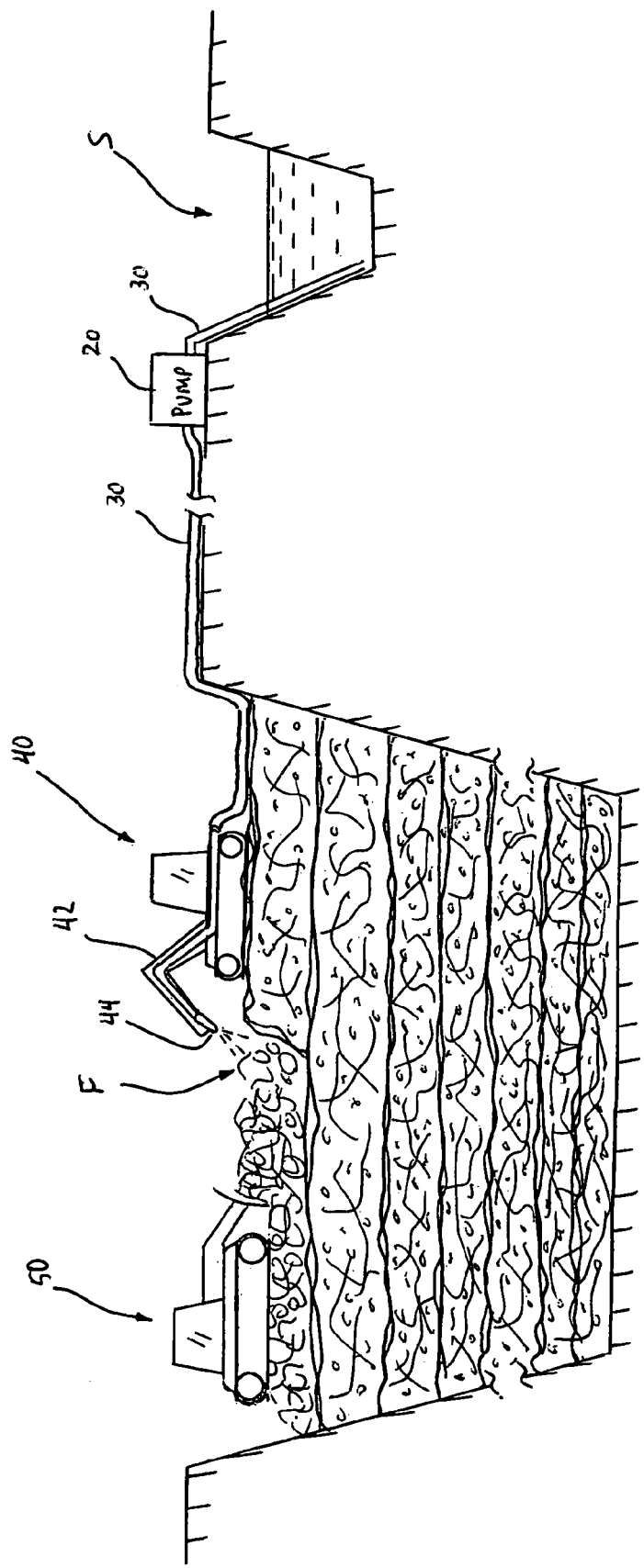
FIG. 2 illustrates a landfill site at which the various steps of the present invention are being performed. In particular, moisture is being added to a volume of solid waste (a substantial portion of which has been exposed to the atmosphere) according to a preferred aspect of the present invention.

Referring specifically to FIG. 2, adding moisture to the solid waste can be carried out using, for example, industrial or agricultural irrigation equipment coupled to a source of liquid S. The irrigation equipment can include a pumping device 20, a system of hoses and/or piping 30, for delivering the liquid from the source S to the pumping device 20 and from the pumping device to the working face of the landfill operation. Sufficient irrigation equipment should be capable of delivering between about 100 to about 500 gallons/minute (between about 6.3 to about 31.6 liters/second). The liquid can be obtained from virtually any water source S, such as a leachate reservoir or tank, a siltation/stormwater pond, industrial waste water reservoir, or other body of water. Delivery of the liquid can be achieved by using manned or unmanned equipment capable of spraying or otherwise discharging the liquid onto the solid waste materials.

According to a preferred aspect of the present invention, illustrated in FIG. 2, moisture is added to the solid waste using a fluid delivery system which includes an excavator 40 comprising a movable arm 42 and a nozzle or fluid jet 44 coupled to the movable arm. The pumping device 20 and the hoses and/or piping 30 are in fluid communication between the fluid source S and the nozzle or fluid jet 44 such that fluid can be delivered from the fluid source to the nozzle or fluid jet. As shown in FIG. 2, a landfill compactor or dozer 50 has exposed a substantial portion of a volume of solid waste to the atmosphere and is moving the volume of solid waste to the working face F of the landfill. The excavator is positioned on top of the landfill directly above the working face of the landfill, whereby the excavator operator can direct the fluid spray emanating from the nozzle or fluid jet 44 downwardly onto the volume of solid waste. By positioning the excavator 40 on top of the landfill above the working face, it is possible for the landfill operators to operate at the working face in an efficient manner unimpeded by the movements of the excavator. This improves the overall efficiency of the landfill operators by avoiding unwanted delays during the movement of landfill equipment (e.g., dozers, excavators, compactors, etc.) into and out of position for carrying out specific functions thereof. Moreover, overspray of the liquid onto other areas of the landfill site is generally avoided, because there is no need to spray the fluid upwardly into the air. To the extent the landfill site is operable such that the working face generally faces prevailing winds, any overspray of the fluid is directed onto the solid waste rather than onto other equipment or hauling trucks in the immediate vicinity of the working face.

Liquid should be added to the solid waste to such a degree that the moisture content sufficiently promotes biostabilization thereof. Thus, the addition of moisture facilitates aerobic and, subsequently, anaerobic decomposition of the moistened waste. If the moisture content is too low, biostabilization will be impeded and the time for the municipal solid waste to completely biostabilize will increase. However, if the moisture content is too high, the landfill site may generate leachate, which is undesirable since there is a tendency for it to seep into the leachate collection system and thereby increase the potential for leakage through the primary liner system.

Preferably, moisture is added to the solid waste material at a rate of about 25 to about 50 gallons of liquid per ton of solid waste (about 105 liters to about 210 liters of liquid per 1000 kg of solid waste). The amount of liquid to be applied can be easily determined by measuring the daily intake of the incoming solid waste. The adding of liquid should result in municipal solid waste that has no excess amounts of liquid and yet has no dry areas. When natural precipitation levels are high on any given day (i.e., sufficient to achieve the desired level of moistening the exposed solid waste), additional application of liquid to the solid waste may not by necessary. Thus, natural precipitation is another form of adding moisture to the solid waste.

After landfilling and adding moisture to the solid waste, the solid waste is compacted. Compacting can be performed with any conventional equipment such as landfill compactors. Generally, compacting is performed to eliminate voids in the lift of newly introduced solid waste and, hence, increase landfill densities. As a result of compacting, the solid waste has an initial density of between about 1,000 to about 1,500 lbs/yd$^3$ (about 593 to about 890 kg/m$^3$), preferably about 1,200 to about 1,500 lbs/yd$^3$ (about 712 to about 890 kg/m$^3$).

If necessary or so desired, additional volumes of moisture can be added to the solid waste after compacting in order to achieve the previously indicated level of moisture for the solid waste.

The daily covering material is used to cover the newly introduced and treated, as described above, solid waste to provide a barrier to reduce the emanation of odorous gases from the waste pile, reduce the ability of birds and various insects from disturbing the waste pile, and reduce the possibility of blowing litter. The daily covering material can be a synthetic or manufactured covering material, or any other naturally existing soil or by-product material which can function in this capacity. Suitable daily covering materials include, without limitation, synthetic covering materials of the type described in U.S. Pat. No. 5,265,979 to Hansen (which is hereby incorporated by reference), foundry sand, auto fluff, processed C & D, and soil.

Once the waste pile is compacted and covered, aerobic decomposition of the waste pile will occur until the oxygen within the waste has been depleted, at which point in time anaerobic decomposition will continue over an extended duration. One particular advantage of the present invention is that it does not require facilitating aerobic decomposition for extended periods of time (i.e., 30 to 60 or more days) in order to achieve improved levels of compaction for the landfill site. Thus, no auxiliary introduction of air to the landfilled waste occurs.

By purposefully avoiding the introduction of auxiliary air into the landfilled waste, there is no introduction of additional material, e.g., pipes and the like, which further contributes to the volume of solid waste and creates extra financial burdens for the assembly and management of systems for accomplishing the same. Moreover, by eliminating the need for injecting air or other gases into the landfilled waste, the exhaust of undesirable gases from the landfilled waste is also avoided.

The initial exposure of the waste to the atmosphere provides sufficient oxygen supply to enable the initial stages of aerobic decomposition to occur, which facilitates biostabilization of the waste. Typically, the decomposing solid waste will reach elevated temperatures ranging from about 120° F. (49° C.) to about 150° F. (66° C.). Elevated temperatures in this range will exist for one or more weeks, followed by cooling of the landfilled solid waste as the anaerobic phase of decomposition begins. By avoiding the introduction of auxiliary air, the decomposition cycle more quickly enters the anaerobic phase, yielding more by-product gases that can be harvested. Thus, the initial addition of moisture at the working face, followed by compaction, favors biostabilization and early entrance into the anaerobic phase of the decomposition cycle.

Additional layers of newly introduced solid waste can be applied over the previously treated waste, utilizing the steps described above, enabling further in-place densification of the biostabilized materials over the lifetime of the landfill site. Based on multiple lifts and the further consolidation of the waste, overall landfill densities of about 1500 to about 2000 lbs/yd$^3$ (about 890 to about 1186 kg/m$^3$) or greater should be achieved.

Although the invention has been disclosed in relation to the embodiments described herein, it is apparent that the various modifications, substitutions, equivalents and other changes may be utilized without departing in any way from the spirit of the invention. Any such modifications are intended to be within the scope of the invention as defined by the following claims.

What is claimed is:

1. A method of adding moisture to municipal solid waste comprising:

providing a fluid delivery system which includes
    an excavator comprising a movable arm and a fluid jet coupled to the movable arm and
    industrial or agricultural irrigation equipment comprising a pump having an inlet and an outlet, a first conduit in fluid communication between a fluid source and the pump inlet, and a second conduit in fluid communication between the fluid jet and the pump outlet, wherein the excavator is positioned on top of a landfill adjacent to a working face of the landfill;

exposing a substantial portion of a volume of municipal solid waste to the atmosphere; and adding moisture to the volume of municipal solid waste using the fluid delivery system in an amount sufficient to facilitate decomposition of the municipal solid waste.

2. The method according to claim 1, wherein said exposing is carried out without substantially reducing the size of waste particles in the volume of solid waste.

3. The method according to claim 1, wherein said adding moisture and said exposing are carried out simultaneously.

4. The method according to claim 1, wherein said exposing is carried out with a landfill dozer or an excavator equipped with a grapple hook.

5. The method according to claim 1, wherein said exposing is carried out at a working face of a landfill.

6. The method according to claim 1, wherein the excavator is provided directly above the working face and said adding moisture is carried out by spraying fluid from the fluid jet downwardly onto the volume of solid waste.

7. The method according to claim 1, wherein said adding moisture is carried out at a rate of about 25 to about 50 gallons of liquid per ton of solid waste.

* * * * *